(12) United States Patent
Fontignie et al.

(10) Patent No.: US 9,495,181 B2
(45) Date of Patent: Nov. 15, 2016

(54) CREATING A VIRTUAL APPLIANCE

(71) Applicant: International Business Machines Corporation, Armonk, NY (US)

(72) Inventors: Jacques Fontignie, Onex (CH); Claudio Marinelli, Rome (IT); Pierre-Antoine Queloz, Versoix (CH); Ruth E. Willenborg, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/363,704

(22) PCT Filed: Dec. 4, 2012

(86) PCT No.: PCT/EP2012/074323
§ 371 (c)(1),
(2) Date: Jun. 6, 2014

(87) PCT Pub. No.: WO2013/083547
PCT Pub. Date: Jun. 13, 2013

(65) Prior Publication Data
US 2014/0359618 A1 Dec. 4, 2014

(30) Foreign Application Priority Data
Dec. 7, 2011 (EP) .................................... 11192273

(51) Int. Cl.
*G06F 9/455* (2006.01)
*G06F 9/445* (2006.01)
*G06F 9/44* (2006.01)

(52) U.S. Cl.
CPC .................. *G06F 9/455* (2013.01); *G06F 8/60* (2013.01); *G06F 8/63* (2013.01); *G06F 8/64* (2013.01); *G06F 9/4401* (2013.01); *G06F 9/45533* (2013.01)

(58) Field of Classification Search
CPC ............. G06F 9/45558; G06F 9/5044; G06F 9/45533
See application file for complete search history.

(56) References Cited

U.S. PATENT DOCUMENTS 7,356,679 B1   4/2008 Le et al.
8,347,071 B2 *  1/2013 Yan et al. ........... G06F 9/45558
                                              709/221
(Continued)

FOREIGN PATENT DOCUMENTS

CN    101594387 A    12/2009
CN    102193817 A     9/2011
(Continued)

OTHER PUBLICATIONS

IBM, "Early Determination of the System Type to Support Single Firmware Image on Multiple Systems", IP.com, IP.com No. IPCOM000013685D, Original Publication Date: Mar. 1, 2000, IP.com Electronic Publication: Jun. 18, 2003, 2 pages.

*Primary Examiner* — Anna Deng
*Assistant Examiner* — Brahim Bourzik
(74) *Attorney, Agent, or Firm* — Stephen R. Tkacs; Stephen J. Walder, Jr.; Nicholas D. Bowman

(57) ABSTRACT

A mechanism is provided for creating a virtual appliance. The mechanism receives input of an unmodified virtual appliance and a list of target models. The mechanism creates a modified virtual appliance with an ISO file, a conversion tool, and a list of validated target models based on the input. The modified virtual appliance is configured to boot on the ISO file containing a mini operating system working on all validated target models. Responsive to a deployment of the modified virtual appliance being triggered on a target model, the mini operating system is booted on the corresponding target model. The mini operating system determines the model of the current target model on which the mini operating system is running, and responsive to determining the current target model is a validated target model, applies modifications to an operating system of the virtual appliance in accordance with current target model to form a portable virtual appliance running on target model.

19 Claims, 3 Drawing Sheets

(56) References Cited

U.S. PATENT DOCUMENTS

| | | | |
|---|---|---|---|
| 8,548,919 B2* | 10/2013 | Lo | G06F 9/445 705/59 |
| 2006/0089995 A1 | 4/2006 | Kerr et al. | |
| 2007/0234337 A1* | 10/2007 | Suzuki et al. | G06F 9/45558 717/168 |
| 2008/0294888 A1 | 11/2008 | Ando et al. | |
| 2009/0049160 A1 | 2/2009 | Cherian et al. | |
| 2009/0276771 A1* | 11/2009 | Nickolov | G06F 9/4856 717/177 |
| 2009/0300641 A1* | 12/2009 | Friedman | G06F 11/3664 718/104 |
| 2010/0306355 A1* | 12/2010 | Lagergren | G06F 8/61 709/222 |
| 2011/0161649 A1 | 6/2011 | Bert | |
| 2011/0161952 A1 | 6/2011 | Poddar et al. | |
| 2011/0191765 A1* | 8/2011 | Lo | G06F 9/445 717/174 |
| 2011/0197053 A1* | 8/2011 | Yan | G06F 8/64 713/2 |
| 2012/0290702 A1* | 11/2012 | Vincent | G06F 9/45558 709/223 |
| 2014/0325514 A1* | 10/2014 | Benedetti | G06F 8/65 718/1 |

FOREIGN PATENT DOCUMENTS

| | | | |
|---|---|---|---|
| EP | 2019358 A1 * | 7/2007 | G06F 9/455 |
| WO | WO2013/083547 A1 | 6/2013 | |

* cited by examiner

CREATING A VIRTUAL APPLIANCE

BACKGROUND

The present invention relates in general to the field of virtualization, and in particular to a method for creating a virtual appliance and a system for creating a virtual appliance. Still more particularly, the present invention relates to a mechanism for creating a virtual appliance.

While virtualization brought a lot of advantages in terms of optimization of resource utilization, it also introduced new challenges. One of the new issues is how to guarantee portability of virtual system images between the various hypervisors and their associated management tools. So far, this has been a relatively minor concern in the market because most "cloud computing" solutions seem to leverage a single vendor for the underlying infrastructure. This has held true for projects in the enterprise data center and for the pure cloud solutions that leverage a service like the Elastic Compute Cloud at Amazon. In this context, some see image portability much like they viewed application portability: nice to have, but not essential as long as the cloud vendor maintains support for legacy deployments. Recently, we have seen a potential shift start to occur. Increasing numbers of "cloud as a service" vendors want to supply some portion of the private data center infrastructure in the cloud or, more challenging, move virtual images across hybrid clouds services.

Existing image building and composition tools, for example ICON and CohesiveFT, are able to create virtual images, but these images are limited to one single image format, for example VMDK, and for the moment, there is no easy way to have this images working on other hypervisors or physical machines due to image portability issues. So far, the most common way to move a virtual appliance on a different target platform is to rebuild the images on top of the new infrastructure reproducing the same steps required to build and compose the original image. This will result that an operating system (OS) image is selected and build on a target machine. Then the operating system (OS) image is installed, and software bundles are installed on top of the base operating system (OS) image. Finally, the target machine is captured.

The above approach requires extra effort to build and/or compose the virtual appliance varying the target platform. Also, additional tests are required to certify the new composed image. Further, image sprawl and/or proliferation of images may change the target platform type and the virtual or physical target machine model, and the source image has to be introspected to understand the middleware and/or software stack.

The traditional way to move workload, across heterogeneous platforms is described in the Patent Application Publication U.S. 2011/0197053 A1, "SIMPLIFYING MANAGEMENT OF PHYSICAL AND VIRTUAL DEPLOYMENTS," by Yan et al., for example. The published, patent application discloses a method of deploying a virtual image to a target physical machine by making use of a pre-installation environment attached to the target system, wherein the pre-installation environment is booted up and the virtual image is retrieved over a network, and the virtual image content are extracted after booting into the pre-installation environment. Thereafter, modifications and adjustments are made by correlating the machine specific data of the virtual image with the hardware of the target system.

SUMMARY

The technical problem underlying the present invention is to provide a method for creating a virtual appliance and a system for creating a virtual appliance, which are compatible with different types of hypervisor and physical machines and are able to solve the above mentioned inefficiencies, shortcomings and pain points of prior art methods and systems for creating a virtual appliance.

Accordingly, in an illustrative embodiment, a method for creating a virtual appliance comprises: receiving input of an unmodified virtual appliance and a list of target models; creating a modified virtual appliance with a disk archive file, a conversion tool, and a list of validated target models based on the input; and deploying the modified virtual appliance on each target model within the list of target models. The modified virtual appliance is configured to boot on the disk archive file containing a mini operating system working on all validated target models. Responsive to a deployment of the modified virtual appliance being triggered on a current target model, the mini operating system is booted on the corresponding target model. The mini operating system determines the model of the current target model on which the mini operating system is running, and responsive to determining the current target model is a validated target model, applies modifications to an operating system of the virtual appliance in accordance with the current target model to form a portable virtual appliance running on the current target model.

In another embodiment, a data processing program for execution in a data processing system comprises software code portions for performing a method for creating a virtual appliance when the program is run on the data processing system.

In yet another embodiment, a computer program product stored on a computer readable storage medium, comprises a computer-readable program for causing a computer to perform a method for creating a virtual appliance when the program is run on the computer.

The above, as well as additional purposes, features, and advantages of the present invention will become apparent in the following detailed written description.

BRIEF DESCRIPTION OF THE SEVERAL VIEWS OF THE DRAWINGS

Illustrative embodiment described in detail below is shown in the drawings, in which.

DETAILED DESCRIPTION

Figure 1:
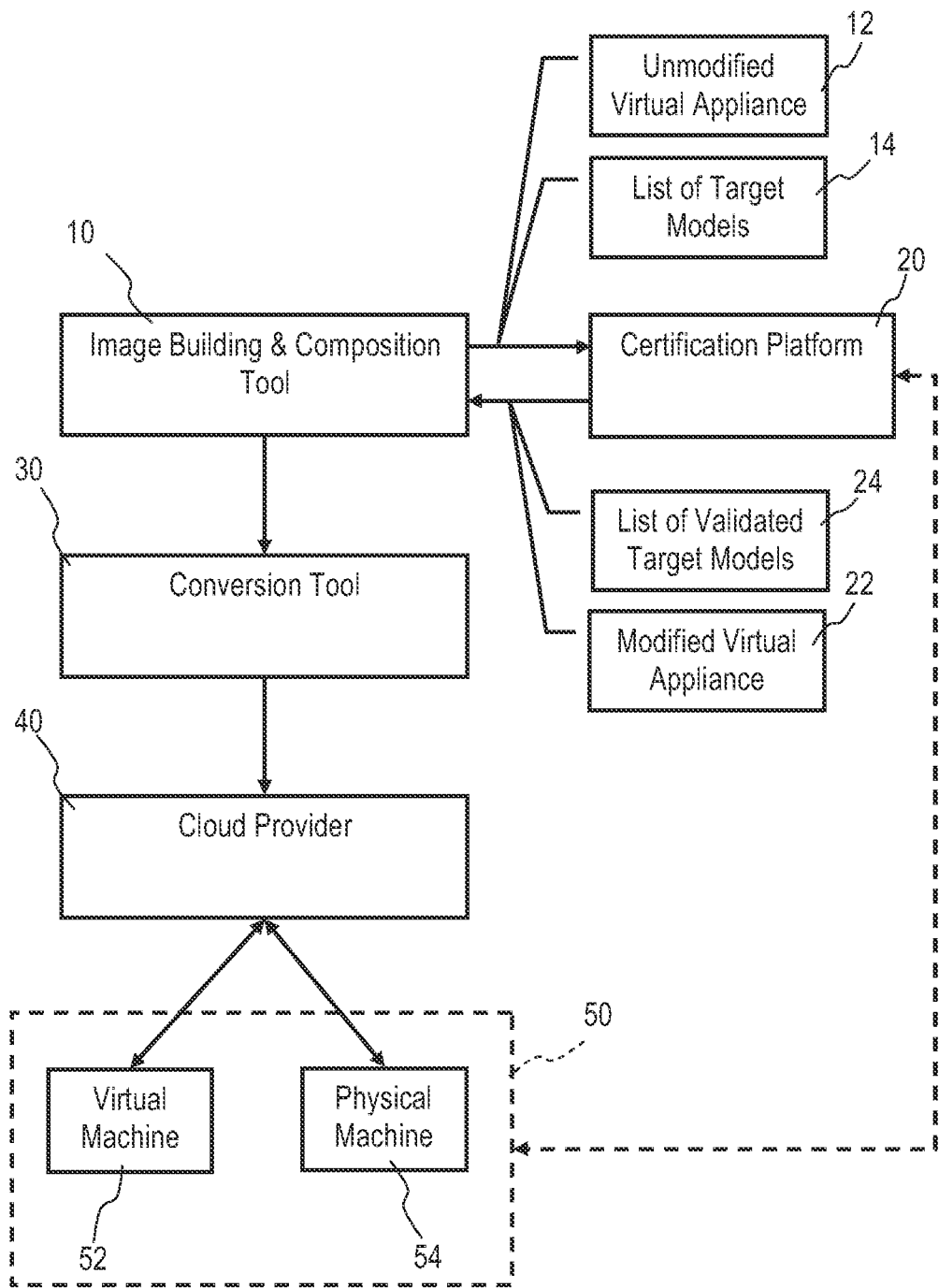
FIG. 1 is a schematic block diagram of a system for creating a virtual appliance in accordance with an illustrative embodiment.

The major aspect of the introduced invention is to build a "universal" ISO that can include all the variations required to port virtual images on the target models.

All in all, the illustrative embodiments are able to provide a way to create universal virtual appliances that can work on any type of hypervisor or physical machine. Instead of providing a virtual appliance as a single virtual disk, the idea is to provide the modified appliance with an ISO file and a conversion tool. The modified appliance is modified to always boot on the ISO file which contains a mini operating system known to be working on all the targeted environments. When this mini operating system has booted, it determines the target model on which it is running and will apply the expected operating system modification to have the operating system of the virtual appliance working on the determined target platform. For the Windows™ operating system, it means driver injection, hardware abstraction layer (HAL) replacement, and virtualization tools injection; and for the Linux™ operating system, it means driver injection, initial ram disk rebuilding and virtualization tools injection. When this step is done, the operating system is known to be compatible with the hardware and the booting can be performed with confidence on the operating system. The conversion tool is used only to convert the virtual disk into another format if needed before injecting the virtual appliance.

Advantageously, the illustrative embodiments provide some hints and/or suggestions on the supported target models by analyzing the drivers in the virtual appliance. Further, in case the user provides a hardware model, the conversion tool can mention if the appliance will likely work and if not which may be the problems like disk missing, network missing or graphical display.

Further, embodiments address the problem of how to know the hardware models with which the virtual appliance is compatible. To solve this problem the modified virtual appliance provides the certification platform which takes as an input the unmodified virtual appliance and the list of target models comprising virtual machines and/or physical machines and returns as an output the modified virtual appliance with the ISO, the conversion tool, and the list of validated target models. In the background, the certification platform attempts to install the virtual appliance on the expected hardware models and returns the list of validated target models which were successful.

Another capability the illustrative embodiments can provide is an encryption and/or decryption process. For example, a virtual appliance (virtual disk) be encrypted and the decryption can be done through the portable ISO file which can prompt for all ISO file. The advantage of this approach is that the password is the responsibility of the end user and not of the hypervisor manager. The idea is that the virtual disk can be decrypted by the end user and not by the operator injecting the image. Usually, on virtual disk format, the whole virtual disk is encrypted; unfortunately that makes it impossible to convert the virtual disks and, even worse, it forces the operator of the hypervisor to decrypt the virtual disk. In such flow, the end user does not know the password and only the operator knows it. To avoid these two problems (operator knowing the password and virtual disk conversion made impossible), the present proposal consists of encrypting not the virtual disk but the operating system image. In such case, the operator can convert the virtual appliance (virtual disk) in any format and the end user can decrypt the disk through the ISO file.

Figure 2:
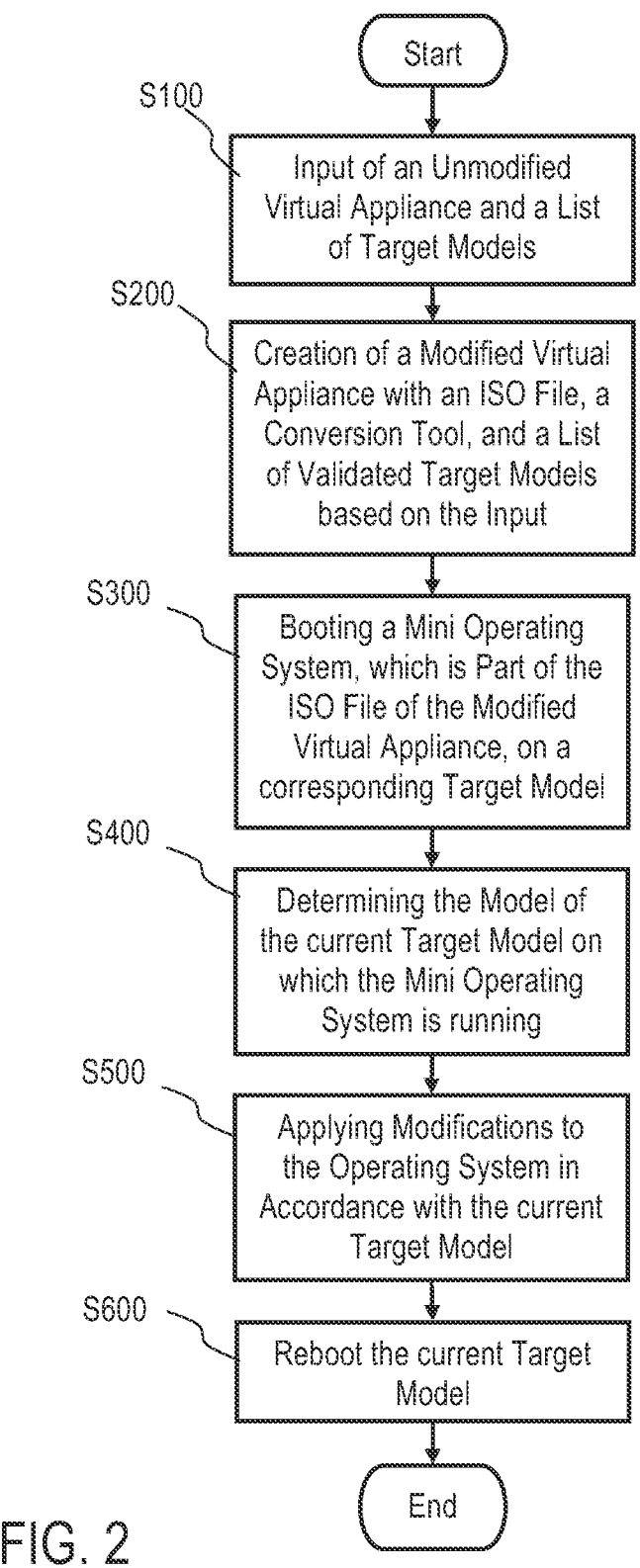
FIG. 2 is a schematic flow diagram of a mechanism for creating a virtual appliance in accordance with an illustrative embodiment.
Figure 3:
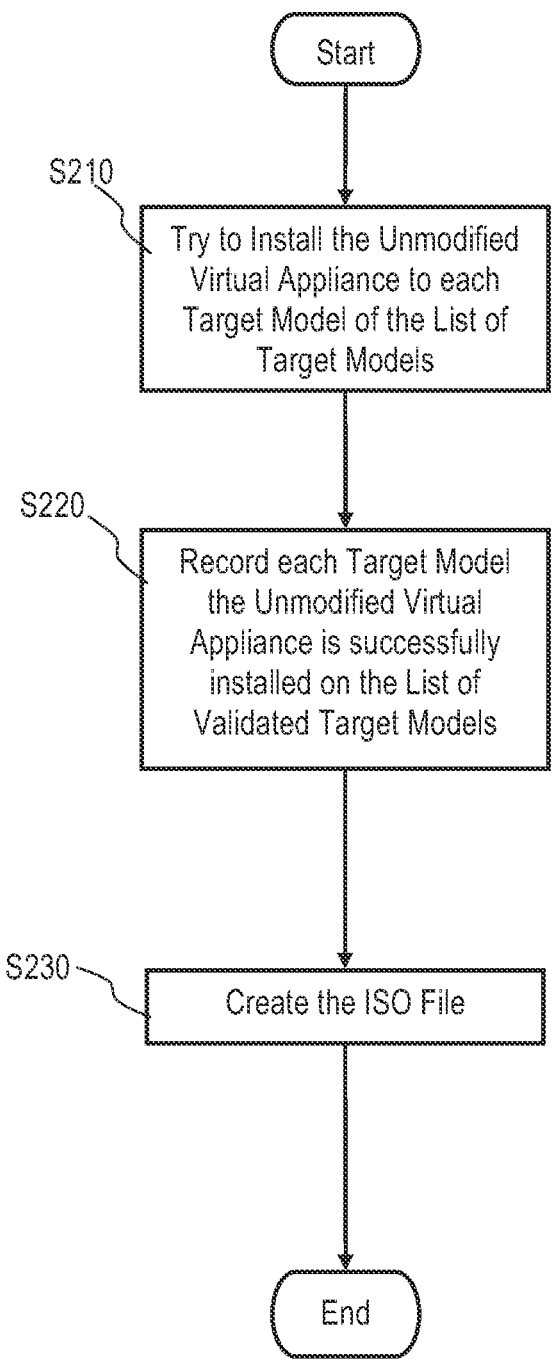
FIG. 3 is a schematic flow diagram of a procedure to modify a virtual appliance used by the mechanism for creating a virtual appliance in accordance with an illustrative embodiment.

FIG. 1 shows a system for creating a virtual appliance in accordance with an illustrative embodiment, and FIGS. 2 and 3 show a mechanism for creating a virtual appliance in accordance with an illustrative embodiment.

Referring to FIG. 1, the shown embodiment employs a system for creating a virtual appliance comprising an image building and composition tool 10 outputting an unmodified virtual appliance 12, and a list of target models 14 to a certification platform 20. The certification platform 20 creates a modified virtual appliance 22 with an ISO file, which is a disk archive file, a conversion tool 30, and a list of validated target models 24 based on the input, and returns the modified virtual appliance 22 to the image building and composition tool 10.

To create the modified virtual appliance 22, the certification platform 20 tries in the background to install the unmodified virtual appliance 12 on each target model 50 on the list of target models 14, and records each target model 50 on which the unmodified virtual appliance 12 is successfully installed in the list of validated target models 24.

In other words, the certification platform 20 takes as an input the unmodified virtual appliance 12 and the list of target models 14 containing virtual machines 52 and/or physical machines 54. For example, the target machine 50 may be the latest HP DL 585 while the source machine was a different model, so the operating system of the virtual appliance 12 may not include the right drivers. In another example, the source machine is equipped with nic=e1000 and disk controller=IDE, and the target machine is equipped with nic=AMD and disk controller=LSI logic.

The certification platform 20 will return the modified virtual appliance 22, modified to boot on the ISO file and comprising the conversion tool 30, and the list of validated target models 24.

Therefore, the modified virtual appliance 22 is configured to boot on the ISO file containing a mini operating system working on all validated target models. The image building and composition tool 10 exports the modified virtual appliance 22 to a cloud provider 40, wherein in case a deployment of the modified virtual appliance 22 on a target model 50 is triggered in the cloud provider 40, the mini operating system is booted on the corresponding target model 50. The cloud provider 40 creates the target model 50 to deploy the modified virtual appliance 22 and binds the ISO file of the modified virtual appliance 22 to the target model 50 booting on the ISO file of the modified virtual appliance 22.

Once, for example, an operator triggers the deployment of the modified virtual appliance 22, the target virtual machine 52 is created and the ISO file is bound to the virtual machine 52. The virtual machine 52 boots on the ISO file, whereby the virtual appliance 22 has been previously modified in order to boot on the next device, which in this case will be the attached ISO file. As result, the mini operating system determines the model 52, 54 of the current target model 50 on which the mini operating system is running. Therefore a pre-operating system kernel is loaded from the ISO file of the modified virtual appliance 22, taking control of the further process. The pre-operating system kernel starts and checks the master boot record (MBR) to determine what is the operating system type of the target model 50, for example the Windows™ operating system or Linux™ operating system. In case the current target model 50 is a validated target model, modifications are applied to the operating system of the virtual appliance 22 in accordance with the current target model 50. To do this, a mini operating system (ram disk) environment is loaded, i.e. Wipe in case the operating system is the Windows™ operating system or MCP in case the operating system is the Linux™ operating system, and an agent is started on top of the mini operating system environment. In case the operating system is the Windows™ operating system, the agent determines what the operating system is and the drivers injected and automatically solves the problem with the built-in drivers in the ISO file by injecting or removing drivers. Further, the agent will automatically inject the hardware abstraction layer (HAL), if needed, and will inject virtualization tools if the target model 50 is a virtual machine 52. In case the operating system is the Linux™ operating system, the agent will rebuilt the ram-disk, inject drivers and add virtualization tools. The measures make the virtual appliance 22 portable, running on different target models 50.

In the shown embodiment the conversion tool 30 is used to convert the modified virtual appliance 22 in another format, if needed. Additionally, the conversion tool 30 provides at least one hint and/or suggestion on supported target models 50 by analyzing drivers in the modified virtual appliance 22. Further, the conversion tool 30 provides statements if the modified virtual appliance 22 will work on hardware model 52, 54, inputted by an operator, and if not what are the problems.

Referring to FIG. 2, the shown embodiment employs a method for creating a virtual appliance comprising inputting an unmodified virtual appliance 12 and a list of target models 14 in step S100. A modified virtual appliance 22 is created with an ISO file, a conversion tool 30, and a list of validated target models 24 based on said input in step S200, wherein the modified virtual appliance 12 is configured to boot on the ISO file containing a mini operating system working on all validated target models. In case a deployment of the modified virtual appliance 22 on a target model 50 is triggered, the mini operating system is booted on the corresponding target model 50 in step S300. In step S400, the model 52, 54 of the current target model 50 on which the mini operating system is running is determined, and in case the current target model 50 is a validated target model, modifications to the operating system of the virtual appliance 22 are applied in accordance with the current target model 50 in step S500. In step S600 the current target model 50 is rebooted.

Referring to FIG. 3, the shown procedure to modify a virtual appliance 12 used by the method for creating a virtual appliance of FIG. 2, tries to install the unmodified virtual appliance 12 on each target model 50 on the list of target models 14, in step S210. In step S220, each target model 50 on which the unmodified virtual appliance 12 is successfully installed is recorded on the list of validated target models 24. In step S230, the ISO file is created, comprising the mini operating system bootable on each target model 50 on the validated target model list 24.

Embodiments of the present invention can be implemented as an entirely software embodiment, or an embodiment containing both hardware and software elements. In one illustrative embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for creating a virtual appliance comprising:
   receiving, by a certification platform executing on a data processing system, input of an unmodified virtual appliance and a list of target models;
   attempting, by the certification platform, to install the unmodified virtual appliance on each target model;
   adding, by the certification platform, each target model on which the unmodified virtual appliance is successfully installed to a list of validated target models;
   creating, by an image building and composition tool executing on the data processing system, a modified virtual appliance with a disk archive file, a conversion tool, and the list of validated target models based on the input; and
   deploying, by the image building and composition tool, the modified virtual appliance on each target model in the list of target models, wherein the modified virtual appliance is configured to boot on the disk archive file containing a mini operating system working on all validated target models;
   wherein responsive to a deployment of the modified virtual appliance being triggered on a current target model, the mini operating system is booted on the current target model;
   wherein the mini operating system determines a model of the current target model on which the mini operating system is running, and responsive to determining the current target model is a validated target model, applies modifications to an operating system of the virtual appliance in accordance with the current target model to form a portable virtual appliance running on the current target model;
   wherein a pre-operating system kernel is loaded from the disk archive file taking control and checking a master boot record to determine a type of operating system of the given target model;
   wherein deploying the modified virtual appliance on a given target model comprises creating the given target model, binding the disk archive file of the modified virtual appliance to the given target model and booting on the disk archive file of the modified virtual appliance.

2. The method according to claim 1, wherein each target model within the list of target models comprises a virtual machine model or a physical machine model.

3. The method according to claim 1, wherein the mini operating system performs at least one of the following:
injecting a driver, removing a driver, injecting a hardware abstraction layer, replacing a hardware abstraction layer, injecting a virtualization tool, or rebuilding an initial ram disk.

4. The method according to claim 1, wherein the conversion tool is used to convert modified virtual appliance in another format.

5. The method according to claim 1, wherein the conversion tool provides at least one hint indicating supported target models by analyzing drivers in the modified virtual appliance.

6. The method according to claim 1, wherein the conversion tool provides statements indicating whether the modified virtual appliance will work on a given hardware model and if not what are the problems.

7. An apparatus comprising:
a processor; and
a memory coupled to the processor, wherein the memory comprises instructions which, when executed by the processor, cause the processor to:
receive, by a certification platform executing on a data processing system, input of an unmodified virtual appliance and a list of target models;
attempt, by the certification platform, to install the unmodified virtual appliance on each target model;
add, by the certification platform, each target model on which the unmodified virtual appliance is successfully installed to a list of validated target models;
create, by an image building and composition tool executing on the data processing system, a modified virtual appliance with a disk archive file, a conversion tool, and the list of validated target models based on the input; and
deploy, by the image building and composition tool, the modified virtual appliance on each target model in the list of target models,
wherein the modified virtual appliance is configured to boot on the disk archive file containing a mini operating system working on all validated target models;
wherein responsive to a deployment of the modified virtual appliance being triggered on a current target model, the mini operating system is booted on the current target model;
wherein the mini operating system determines a model of the current target model on which the mini operating system is running, and responsive to determining the current target model is a validated target model, applies modifications to an operating system of the virtual appliance in accordance with the current target model to form a portable virtual appliance running on the current target model;
wherein a pre-operating system kernel is loaded from the disk archive file taking control and checking a master boot record to determine a type of operating system of the given target model;
wherein deploying the modified virtual appliance on a given target model comprises creating the given target model, binding the disk archive file of the modified virtual appliance to the given target model and booting on the disk archive file of the modified virtual appliance.

8. The apparatus according to claim 7, wherein each target model within the list of target models comprises a virtual machine model or a physical machine model.

9. The apparatus according to claim 7, wherein the conversion tool provides at least one hint indicating supported target models by analyzing drivers in the modified virtual appliance.

10. A computer program product comprising a non-transitory computer readable storage medium having a computer readable program stored therein, wherein the computer readable program, when executed on a computing device, causes the computing device to:
receive, by a certification platform executing on a data processing system, input of an unmodified virtual appliance and a list of target models;
attempt, by the certification platform, to install the unmodified virtual appliance on each target model;
add, by the certification platform, each target model on which the unmodified virtual appliance is successfully installed to a list of validated target models;
create, by an image building and composition tool executing on the data processing system, a modified virtual appliance with a disk archive file, a conversion tool, and the list of validated target models based on the input; and
deploy, by the image building and composition tool, the modified virtual appliance on each target model in the list of target models,
wherein the modified virtual appliance is configured to boot on the disk archive file containing a mini operating system working on all validated target models;
wherein responsive to a deployment of the modified virtual appliance being triggered on a current target model, the mini operating system is booted on the current target model;
wherein the mini operating system determines a model of the current target model on which the mini operating system is running, and responsive to determining the current target model is a validated target model, applies modifications to an operating system of the virtual appliance in accordance with the current target model to form a portable virtual appliance running on the current target model;
wherein a pre-operating system kernel is loaded from the disk archive file taking control and checking a master boot record to determine a type of operating system of the given target model;
wherein deploying the modified virtual appliance on a given target model comprises creating the given target model, binding the disk archive file of the modified virtual appliance to the given target model and booting on the disk archive file of the modified virtual appliance.

11. The computer program product according to claim 10, wherein each target model within the list of target models comprises a virtual machine model or a physical machine model.

12. The computer program product according to claim 10, wherein the conversion tool provides at least one hint indicating supported target models by analyzing drivers in the modified virtual appliance.

13. The method according to claim 1, wherein the mini operating system performs at least one of the following injecting a driver or removing a driver.

14. The method according to claim 1, wherein the mini operating system performs at least one of the following injecting a hardware abstraction layer or replacing a hardware abstraction layer.

15. The method according to claim 1, wherein the mini operating system performs injecting a virtualization tool.

16. The method according to claim 7, wherein the mini operating system performs at least one of the following:
   injecting a driver, removing a driver, injecting a hardware abstraction layer, replacing a hardware abstraction layer, injecting a virtualization tool, or rebuilding an initial ram disk.

17. The apparatus according to claim 7, wherein the conversion tool is used to convert modified virtual appliance in another format.

18. The computer program product according to claim 10, wherein the mini operating system performs at least one of the following:
   injecting a driver, removing a driver, injecting a hardware abstraction layer, replacing a hardware abstraction layer, injecting a virtualization tool, or rebuilding an initial ram disk.

19. The computer program product according to claim 10, wherein the conversion tool is used to convert modified virtual appliance in another format.

* * * * *